Nov. 28, 1961 S. J. GARTNER ET AL 3,010,490
AUTOMATIC GRID STRETCHER
Filed July 17, 1958 5 Sheets-Sheet 4
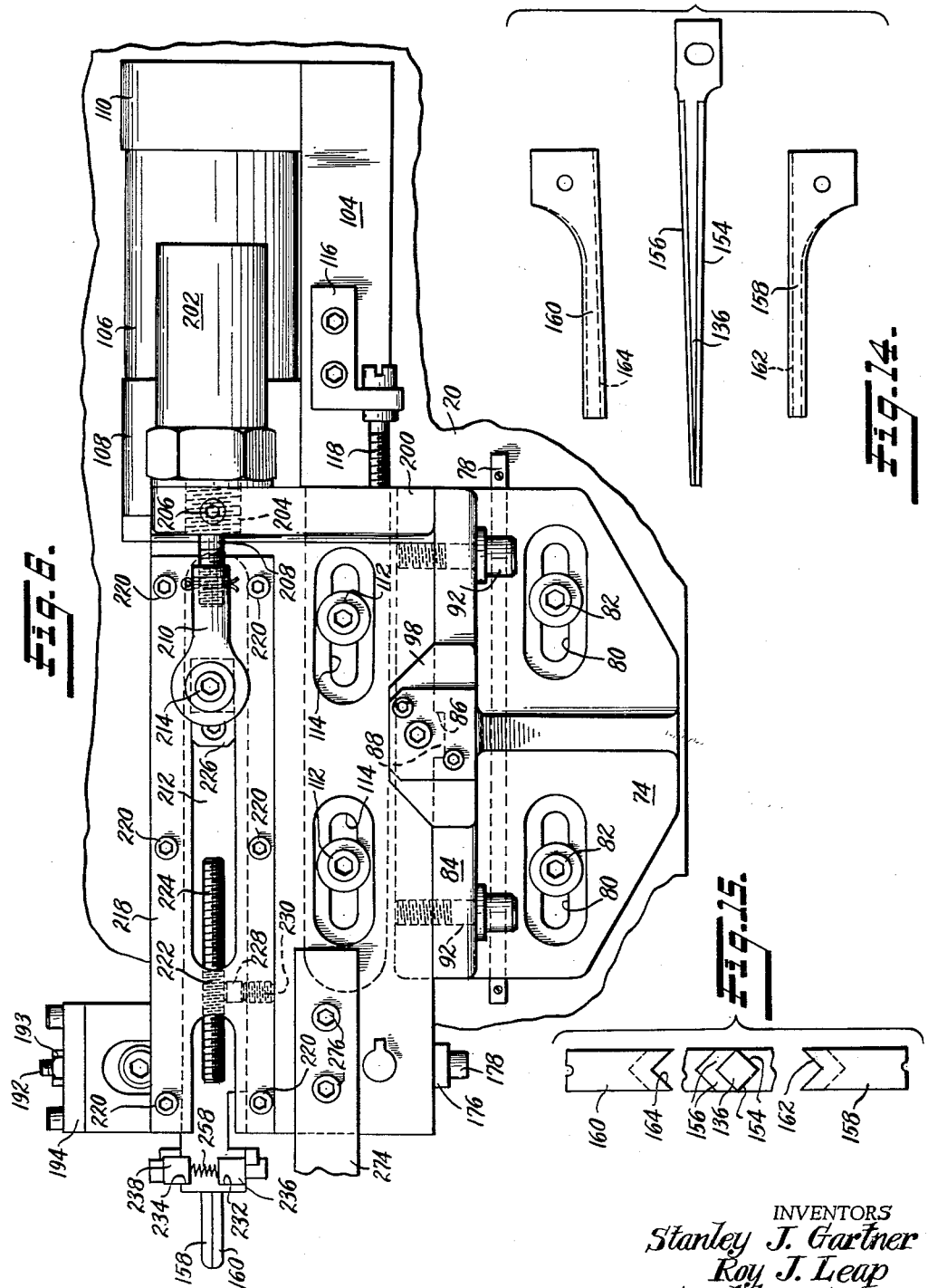
INVENTORS
Stanley J. Gartner
Roy J. Leap
Gerald F. Sanker
BY Michael Hertz
ATTORNEY Nov. 28, 1961　　　S. J. GARTNER ET AL　　　3,010,490
AUTOMATIC GRID STRETCHER
Filed July 17, 1958　　　　　　　　　　　5 Sheets-Sheet 5
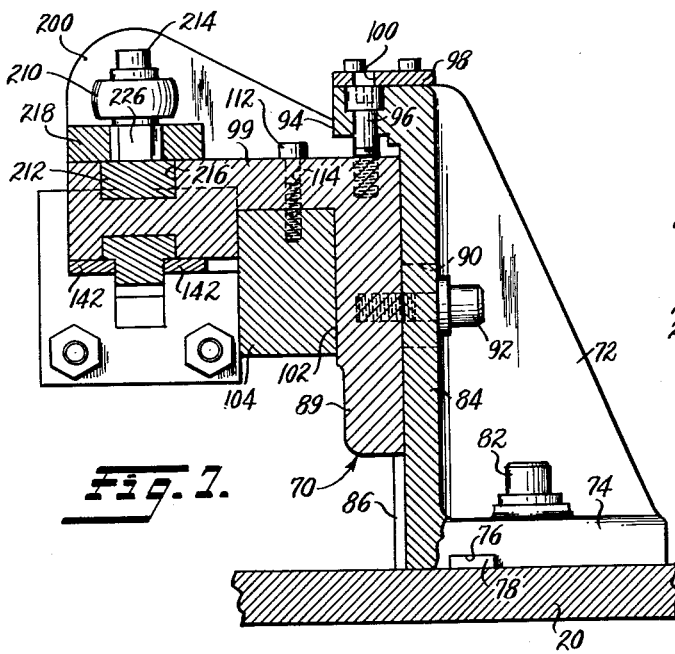
Fig.7.
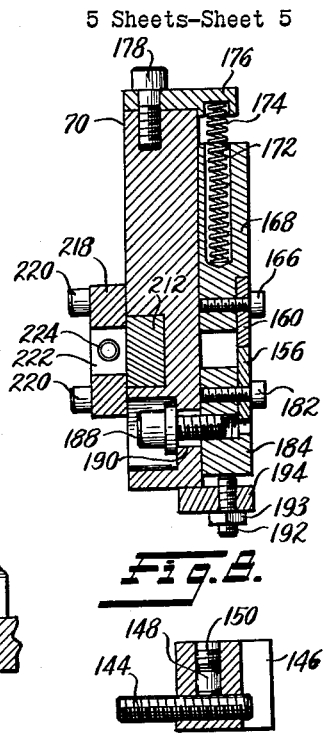
Fig.8.
Fig.10.
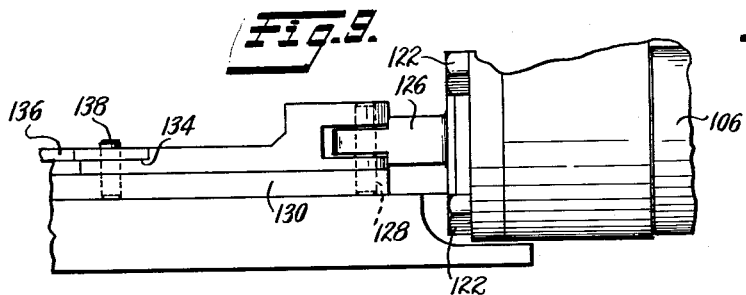
Fig.9.
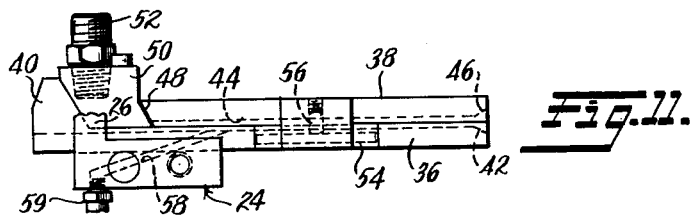
Fig.11.
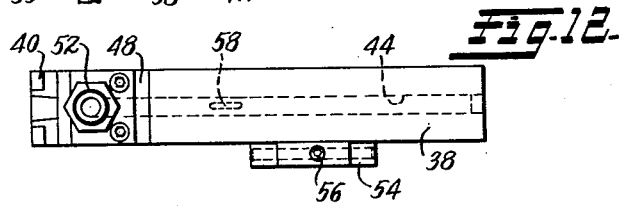
Fig.12.
INVENTORS
Stanley J. Gartner
Roy J. Leap
Gerald F. Sanker
BY Michael Hertz
ATTORNEY

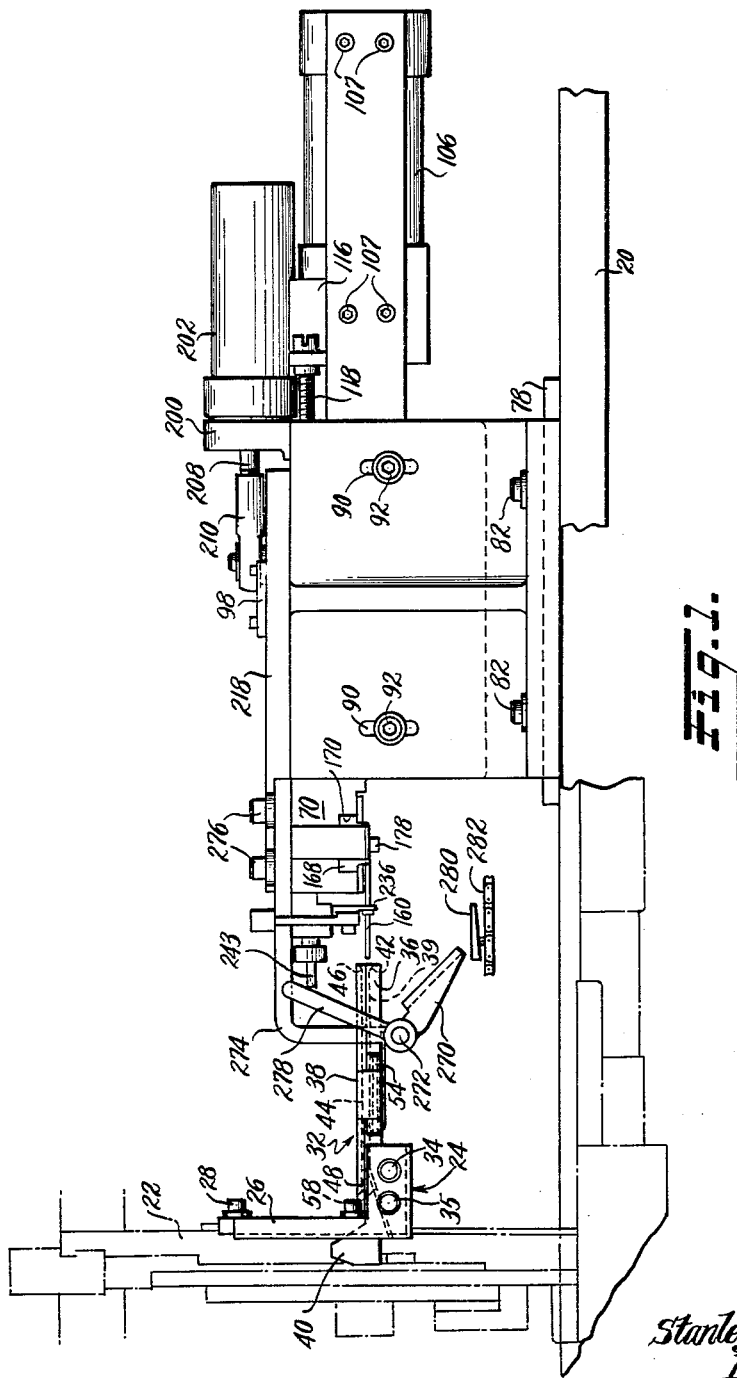

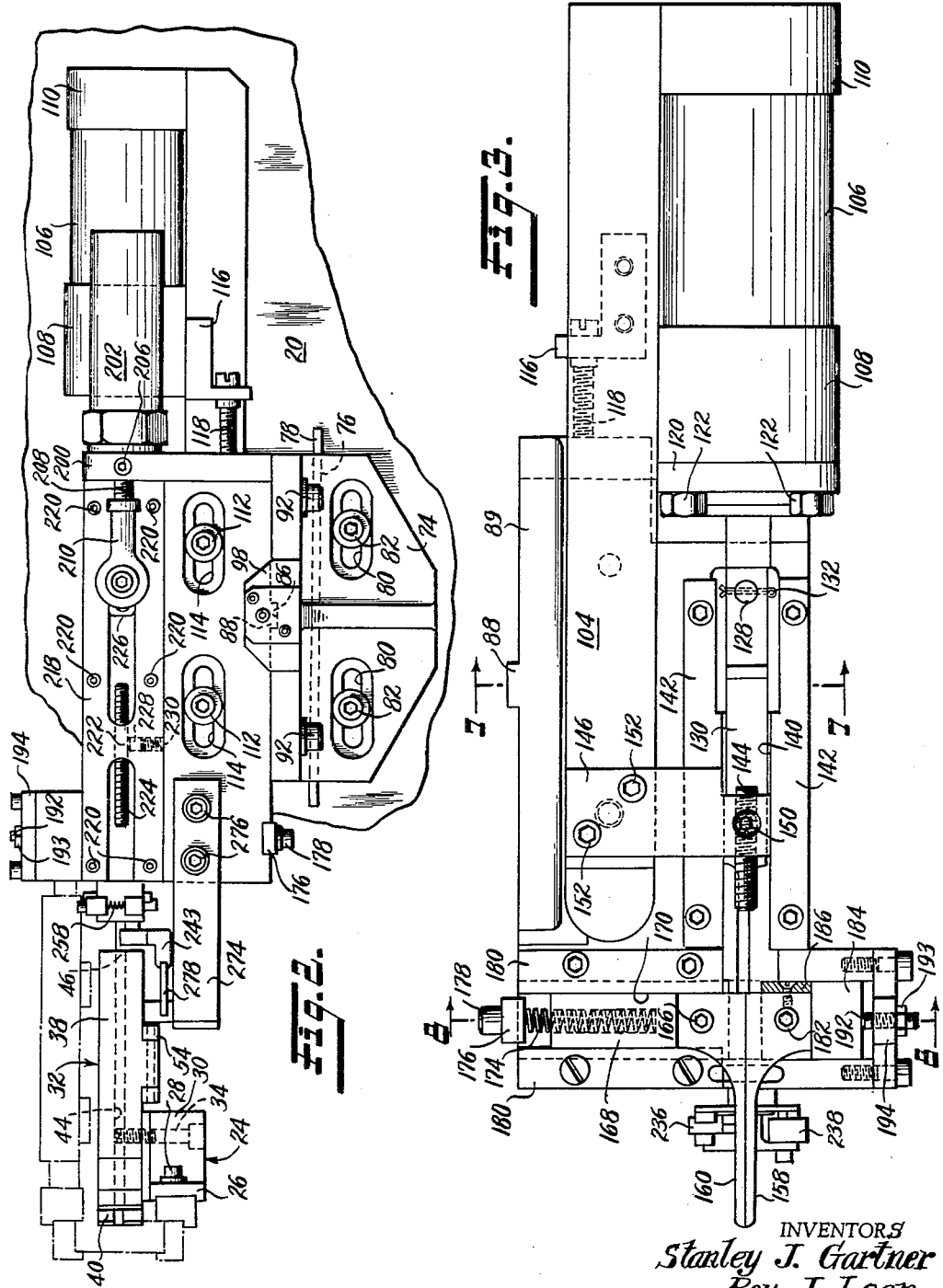

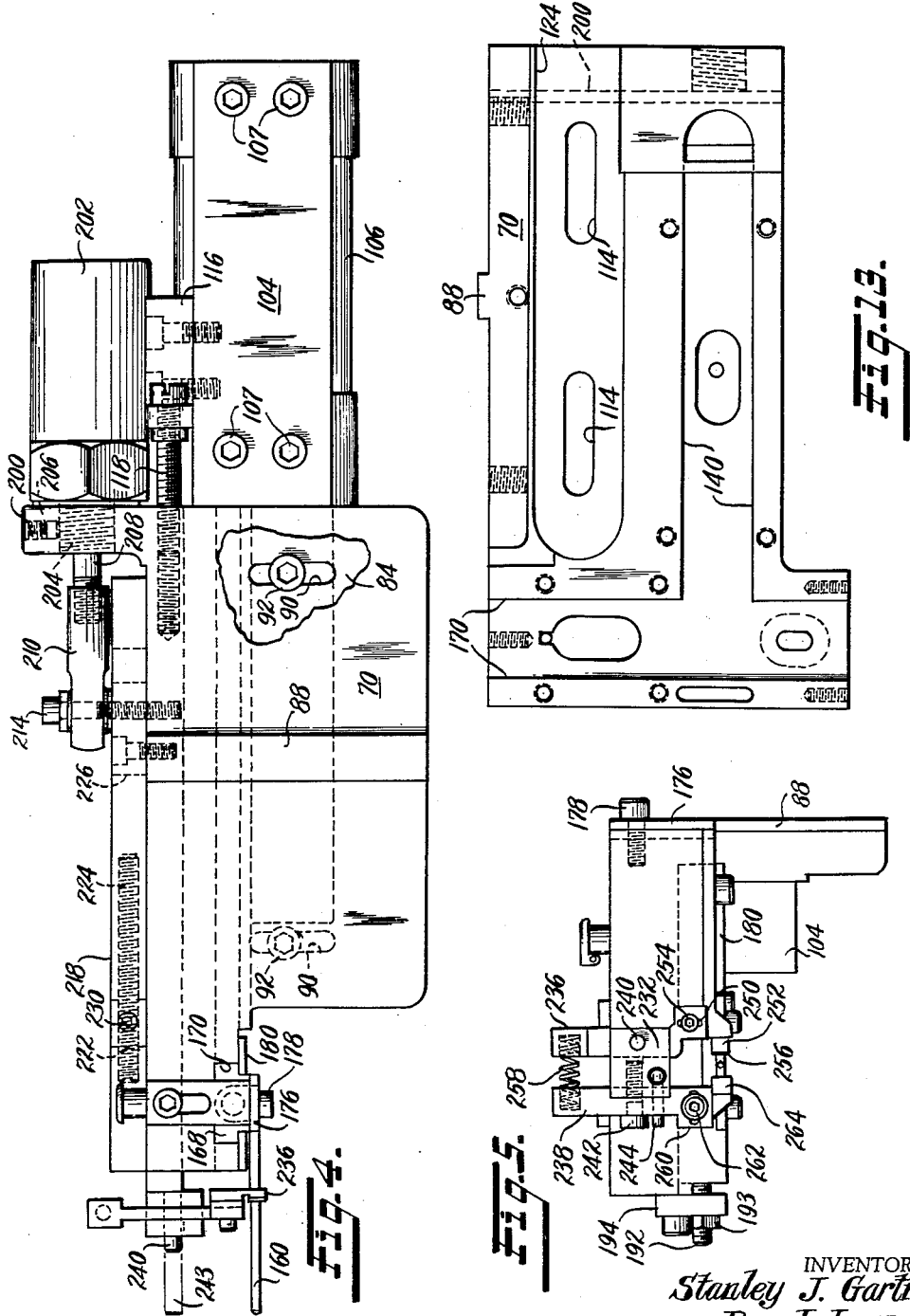

United States Patent Office 3,010,490
Patented Nov. 28, 1961

---

3,010,490
AUTOMATIC GRID STRETCHER
Stanley J. Gartner, Emporium, Roy J. Leap, Lakemont, and Gerald F. Sanker, Altoona, Pa., assignors, by mesne assignments, to Sylvania Electric Products Inc., Wilmington, Del., a corporation of Delaware
Filed July 17, 1958, Ser. No. 749,101
14 Claims. (Cl. 140—71.5)

This invention relates to mechanism for stretching the grid laterals of a grid after it has been preliminarily formed in a grid forming machine.

It is an object of the invention to provide such a stretcher at the delivery end of the grid forming machine and to work in synchronism therewith to avoid unnecessary handling of the preliminarily formed grid.

It is a further object of this invention to still further minimize handling of the grid to provide a grid stretcher on a grid forming machine which shall be provided with automatic means to discharge the stretched grids onto a receiving conveyor associated with the grid forming machine and the stretching mechanism.

It is a still further object to provide a grid stretcher on a machine which has both a means for forming a grid and a conveyor for removing the grid from the grid forming mechanism, the grid stretcher being interposed between the grid former and the conveyor and automatically receiving a preliminarily formed grid from the grid former, stretching it and automatically depositing the stretched grid onto the conveyor.

These and other objects will be understood upon a consideration of the following specification, when taken in conjunction with the accompanying drawings in which:

FIG. 1 is an elevational view of the grid stretcher, showing its association with the grid forming machine and the conveyor.

FIG. 2 is a top plan view thereof.

FIG. 3 is an enlarged bottom view of the grid stretcher mechanism with a device for transferring grids from the grid forming machine onto the grid stretcher removed.

FIG. 4 is a side elevation of the mechanism shown in FIG. 3.

FIG. 5 is a front view thereof.

FIG. 6 is an enlarged top view of the grid stretcher similar to FIG. 2 but with the conveyor removed.

FIG. 7 is an enlarged section along the line 7—7 of FIG. 3.

FIG. 8 is a section along the line 8—8 of FIG. 3.

FIG. 9 is a detail showing the connection of a drive motor with a blade spreader tongue.

FIG. 10 is a detail showing how a stop pin is held in place by a plug and screw.

FIG. 11 is a side view of a chute for transferring a grid from the grid winding machine onto grid stretcher blades.

FIG. 12 is a top view thereof.

FIG. 13 is a view of the underside of a housing.

FIG. 14 is a plan view of a blade stretcher tongue and associated stretcher blades.

FIG. 15 is an enlarged view thereof.

The grid stretcher of this invention is well adapted to operate in conjunction with a grid winding machine of the type disclosed in the Gartner Patent 2,759,499 although it will operate well with any form of machine which dispenses individual objects, such as grids, which are to be stretched. In the form of machine illustrated in the just referred to Gartner patent there are a number of heads operating in synchronism to feed a string of grids, comprised of a pair of side rods and a grid lateral wire wound spirally about the side rods, with wide spacings between groups of closely wound wire. The Gartner patent also stretches the side rods longitudinally and finally cuts up the string into individual grids. The grid string cut off head has a reciprocating motion longitudinally of the grid string and, at one end of its motion, cutter blades mounted on the head effect cutting off a grid from the grid string allowing the cut off grid to drop onto a chute, not shown in the patent. In a later patent to Gartner 2,821,825 the cut off grids from the last head are deposited in intermittently movable buckets, from which they are removed one by one and placed in individual compartments in trays. In the prior art the grids in the trays were subsequently removed and frequently were stretched laterally to stretch the wound wire prior to assembly of the grid with other electrodes to form an electron tube.

In accordance with this invention, a grid stretcher is interposed between the cut off head of the grid former and the bucket conveyor, this stretcher automatically receiving the grids as they leave the cut off head of the grid former, automatically laterally stretching the grid and automatically depositing the stretched grid into the buckets, thus reducing handling of the grids, minimizing the floor space which would be required to accommodate a separate grid stretcher and simplifying the construction of the stretcher since it cooperates with parts already existent on the grid former and traying machine shown in Patent 2,821,825, all as will be made clear by referring to the drawings of this invention more in detail and to the following specification.

Referring to FIGS. 1 and 2 of this disclosure, at 20 there is indicated a table top in which the cut off head 22 of the grid forming machine is reciprocated laterally, as viewed in FIG. 1, by the mechanisms disclosed in the aforesaid patents. A chute supporting plate 24 has a vertical wall 26 secured to the cut-off head by a bolt 28, the plate having a second horizontal wall 30 at right angles to wall 26 abutting a vertical side face of a block 31 and fastened thereto by a screw 34 and centering dowel pin 35. The chute 32, see FIGS. 1, 2 and 11, is a multipart affair consisting in part of a base 36 and a displaceable lid 38. The base 36 is a flat member having a central longitudinal channel 39 therein. At the receiving end of the base there are upstanding side walls 40 to receive the oncoming end of the approaching wound grid and which during cut off from its grid string may tilt upwardly at its free end. The delivery end of the base of the chute is provided with a bevelled edge 42 to facilitate the entry of a stretcher tongue, which may occur with some types of grids. The lid 38 may also be undergrooved as indicated at 44 to cooperate with the channel 39 for the passage of a grid formed on the grid forming machine, as the grid winding machine of the Gartner patents. The lid has a rear bevelled end 46 cooperating with the beveled edge 42 to form a flaring mouth and the forward end of the lid is bevelled as indicated at 48. In between the bevelled end 48 on the cover and parallel bevels on the upstanding walls is a ported block 50 suitably fastened to the base 36, the block having a nipple 52 to which a compressed air duct is connected. When a puff of air is admitted to the nipple under control of a cam on the grid winding machine any debris lodging in the front end of the chute and between the upstanding walls, such as loose turns of grid wire, will be blown out. While such a blow out mechanism is desirable it is not necessary and the lid 38 could extend directly to the side walls 40. Any convenient means may be utilized to shiftably fasten the lid to the casing; for example, a conventional hinge, as indicated at 54, may be employed in which the hinge pin is held in place by a set screw 56. The base is provided with a port 58 slanting upwardly and toward the delivery end of the chute, the port being suitably coupled as by a nipple 59 to a source of air under pressure, also under control of a cam on the grid winding machine. After a grid has been cut off from its string and while the cut-off head is toward the right, as viewed in FIG. 1, a puff of air admitted to the port 58 will suck the grid into the chute and will force it through the chute and onto grid stretcher blades 158 and 160. The cover of the chute while here shown as hinged may be otherwise made displaceable to provide easy access to the channels in the chute and cover for clean out purposes.

The grid stretcher mechanism comprises a main casting or housing 70 supported from the bed plate of the machine by a gusseted angle 72. The horizontal flange 74 of the angle is provided with keyway 76 slidable on a key 78 fixed on the table 20 and is further provided with elongated slots 80 through which bolts 82 are passed to lock the angle in an adjusted position longitudinally of the table top. The vertical flange 84 of the angle is provided with a keyway 86 cooperating a vertical rib 88 on a vertical wall 89 of the housing 70. The flange 84 is provided with vertical slots 90 through which bolts or Allen head screws 92 are passed to fasten the housing 70 to the angle at a desired vertical elevation. The upper end of the angle has a seated lip 94 for seating a housing shifting screw 96, the head of which is confined between the seat in the lip and a hold down plate 98 fastened to the lip. The plate has an opening 100 smaller than the head of the screw to enable a screw driver to engage the head of the screw and rotate the same. The screw is threaded onto the upper part of the housing 70. For fine vertical adjustment of the housing relative to the angle, the bolts 92 are loosened, the screw 96 rotated to thread more or less into the housing while vertical movement of the screw is prevented by the holddown plate 98. After the housing has been thus adjusted, the bolts 92 are again tightened. The housing 70 is provided, besides its vertical wall, with a cantilevered horizontal flange 99. The flange is multichanneled as will be described. In the undersurface of the flange is a wide channel 102 slidably adjustably retaining a support bar 104 on the outer free end of which is fastened a double acting air motor 106, as by means of screws 107 passing through the bar and threaded into the end blocks 108 and 110 of the motor. The bar is held in adjusted position by a pair of bolts 112 threaded into the bar and passing through slots 114 in the cantilevered flange. To permit of fine adjustment of the bar, the same has fixed thereto an angled fork 116, and a shouldered screw 118 threaded into the housing engages the tines of the fork. Adjustment of the screw will thus shift the angled fork and attached bar whereupon the bar can be tightened in place by turning down the bolts 112. A square guide block 120 is fastened by means of bolts 122 to the end block 108 of the motor, the guide block riding in a guiding recess 124 in the right hand end of the housing 70, as viewed in FIG. 13.

The piston of motor 106 is connected by a pin 128 with a forked slide 130, the major portion of which is T-shaped in cross-section, a cotter 132 securing the pin to the slide. The slide at its forward end is provided with a depressed seat 134 for the butt end of a tongue 136 fastened to the slide by a dowel 138. The tongue and slide both operate in a channel 140 in the housing and plates 142 overlap the arms of the T-shaped slide and the edges of the butt end of the tongue to retain both slide and tongue in the channel. The tongue, as will be described later, serves to spread stretcher blades apart to effect lateral stretching of a grid. To limit the movement of the tongue to the left, FIGS. 3 and 10, a stop screw 144 is provided, this screw being held in a bore in a cross plate 146 by a soft brass plug 148 engaging the threads on the screw and a tightening screw 150 threaded into the cross plate engaging the plug. The stop screw 144 is in horizontal alignment with the back of the top of the fork on the slide 130 and will thus limit the throw of the motor piston, slide, and tongue. The cross plate is secured, at the opposite end from the stop screw, to the support bar 104 by screws 152 so that, as the bar is longitudinally adjusted to vary the projected end position of the end of the tongue relative to the grid chute, the stop screw will move with it and thus not affect the length of stroke of the motor piston. The tongue 136, see FIGS. 14 and 15 except for its butt end, is tapered and is polygonal in cross-section. It has a pair of intersecting walls 154 which are parallel to the stroke of the piston and a second pair of intersecting walls 156 which incline slightly with respect to the stroke. The length of the tongue and its taper, the stroke of the piston, and the initial adjustment of the support bar all depend on the length, width, amount of stretch, and type of grid to be stretched.

The tongue cooperates with a pair of stretching blades 158 and 160, the blade 158 being normally fixed at adjusted position and the blade 160 being bodily shiftable during the stretching operation. The blades have angled walls 162 and 164 complementary in shape and angle to the walls on the tongue, the walls 162 being parallel to the stroke of the piston and the walls 164 being inclined thereto, so that as the tongue is thrust in between the blades, the blade 160 will shift, with the opposite outer tongue walls which engage the side rods at all times parallel to one another and to the stroke of the tongue. This action is possible by reason of the blade 160, see FIGS. 3 and 8, being mounted by screw 166 on a spring pressed slide 168, see FIG. 4, T-shaped in cross-section slidable in a cross channel 170 in the underside of the housing, this channel intersecting the channel 140. The slide has a recess 172 in an end thereof accommodating a spring 174 which reacts against a cap plate 176 fastened by a screw 178 to the casing 70 at one end of the cross channel 170. The slide 168 is retained in place in the cross channel by a pair of slide retaining plates 180 fastened to the housing 70 and overlapping the arms of the T-shaped slide. The non shiftable blade is mounted on a screw 182 threaded onto a shouldered back up block 184, one edge of the butt end of the blade fitting against the shoulder to prevent blade rotation. A filler plate 186 is fastened to the block 184 to prevent dirt from entering the cross channel 170 and to steady the back up block. The block 184 may be adjusted along the channel by loosing a holding bolt 188 passing through a slot 190 in the housing 70 and threaded into the block 184 and by adjusting a stop screw 192 provided with a conventional lock nut 193, the screw being threaded through a cap plate 194 bolted to the housing and engaging the block 184. After the adjustment has been made to bring the two spreader blades into proper lateral position with respect to a grid projected from the chute, the bolt 188 is again tightened. In operation of this portion of the spreader and as thus far described, when the cut off head 22 has reached the extreme right hand position is viewed in FIGS. 1 and 2, and the grid length is cut off from the grid string, the front end of the grid, which during the cutting off operation may pivot vertically between the vertical walls of the block 40 about the cut off point on the grid, after cut off comes to rest in alignment with the chute. At this time a valve operated by a cam on the grid winding machine delivers compressed air to the chute via the port 58 in the base, creating a suction at the receiving end of the chute and an air pressure beyond the port 58. Thus a cut off grid will be guidedly sucked into the chute and shot out of the delivery end onto the stretcher blades 158 and 160 the tips of which, at this time, may be a half grid length from the delivery chute. As the cut off head and chute recede from the spreader blades, the double acting motor 106 is energized under control of a cam on the grid winding machine to cause the tapered tongue 136 to enter between the spreader blades and spread them apart against the action of spring 174 to thereby stretch the grid laterals of the grid to a definite width of grid and to one where no loose grid laterals would exist. Next, the cam controlling the motor 106 causes the tongue to be retracted, this occurring late in the stroke of the cut-off head and chute which moves the chute away from the spreader blades.

Other mechanism is provided to definitely limit the movement of the grid onto the spreader jaws, to strip the grid from off the spreader jaws after the grid has been stretched and to assist in the transfer of the stretched grids from the spreader jaws to receiving buckets on a take-off conveyor. This mechanism will now be described.

Atop the rear end of housing 70 is a vertical tapered rib 200 mounting a single acting spring returned air motor 202 under control of a cam on the grid winding machine, as by a threaded reduced neck portion 204 thereof passing through a perforation in the rib 200 and held thereto by a soft plug and set screw combination indicated at 206. The piston 208 of this motor 202 is connected to a rod end bearing 210, see FIGS. 4, 6 and 7, which in turn is connected to a stripper slide 212 by an Allen head cap screw 214 passing through the bearing and threaded into the slide. The slide is held in a channel 216 in the top face of the cantilevered flange 99 of the housing 70 by an H-shaped top plate 218 held to the housing by bolts 220. The screw 214 connecting the rod and bearing with the slide reciprocates along two of the legs of the H-shaped plate while the cross bar 222 of the H-shaped plate supports an adjustable screw 224 engageable with a stop plate 226 fixed on the upper surface of slide 212. The screw 224 is held in adjusted position by a soft brass plug 228 and a back up set screw 230. This enables adjustment of the throw of slide 212. The slide at the left hand end is bifurcated in each vertical face of the bar as indicated at 232 and 234. In the furcation 232 is pivoted a combined stop and stripper holder 236 and in the furcation 234 is fixedly mounted a companion stop and stripper holder 238.

The holder 236 is pivoted on pivot pin 240 suitably fixed in the bifurcation 232. The pin 240 projects to the left, and carries an offset pin or arm 243, FIGS. 2 and 4, to act as a thrust element for a tilting bucket or chute, as will be described. The companion fixed holder 238 is held within the bifurcation 234 by a pair of screws 242 and 244 with suitable set screws for one or both of the screws 242 and 244 to hold them against becoming loose. The pivoted holder 236 is provided with a vertically elongated slot 250 at its lower end to adjustably accommodate a hardened surface stop 252 presented to one of the oncoming grid laterals. The stop is held to the holder 236 by a bolt 254 passing through the slot in the holder and threaded into the stop. The stop itself is provided with a triangular in cross-section tip 256 directed inwardly toward and resting on the shiftable stretcher blade 160, so that as the blade moves away from its companion blade 158, the stop can move with it. This movement takes place against the resistance of a compression spring 258 suitably entrained between the top ends of the pivoted holder 236 and the fixed holder 238. The lower end of fixed holder 238 is provided with a horizontal longitudinally extending slot for adjustably retaining the companion fixed stop 260 in position, a bolt 262 being provided for this purpose. This fixed stop is provided with a hardened squared end tip 264 bearing against the fixed stripper blade 158 and with a hardened face presented to the other of the oncoming grid laterals, with the faces of the two stops lying in the same plane.

After a grid has been blown onto the stretcher blades with the side rods of the grid stopped by the hardened faces of the stripper, one of the stetcher blades moves apart from the other with the surfaces which come into engagement with the inner sides of the side rods in parallel relationship and moving away from each other so as to stretch the grid laterals longitudinally of the cross wires. Then the stretcher blades move toward each other, the motor 202 is energized under cam control of the grid winding machine and the stripper bar 212 is shifted to the left, FIG. 6, and back again. On the motion of the bar 212 toward the left, the stops 252 and 256 push the stretched grid from off the collapsed stretcher blades so that it falls by gravity into a tilting chute or trough 270 pivoted as at 272 to the lower end of the vertical leg of an angled plate 274 whose horizontal leg is secured to the top of the housing 70 by bolts 276. The trough is provided with an integral arm 278 extending at right angles to the trough, the arm being in the path of movement of the thrust pin 243. Thus when the stretched grid is stripped off the stretcher blades it falls into the now substantially horizontal trough. When the pin 243 is withdrawn, the grid slides out of the open end of the trough or chute into a bucket 280 carried by the indexible chain 282, the bucket and chain organization constituting a take-off conveyor and being shown in the Gartner Patent 2,821,825.

What is claimed is:

1. In a grid manufacturing machine having means for forming a string of grids and a horizontally reciprocating cut-off head for cutting off individual grids from that string, a chute attached to the cut-off head through which the cut-off grid is guided and a grid stretcher mounted on a fixed immovable support having stretching blades positioned adjacent an end of the chute in an extreme reciprocatory position of the head, means acting while the blades are in that position for transferring the cut-off individual grid onto the blades, means for separating the blades to effect a stretching of the grid thereon, and means to release the stretched grid from off the blades.

2. The combination with a grid winding machine having a longitudinally reciprocatable cut-off head for cutting off individual grids from a string of grids, a chute movable with the head in its longitudoinal movement and close to the head to receive grids cut off from the string, a stretcher meachanism mounted on a fixed support, means for operating the stretcher mechanism, means for propelling a cut-off grid within the chute, through the chute and onto the stretcher mechanism when the chute is close to the stretcher mechanism, a stripper on a fixed support associated with the stretcher mechanis mfor stripping stretched grids from off the stretcher mechanism, and means for operating the stripper to effect removal of a stretched grid when the chute is removed from the stripper mechanism.

3. The combination with a grid winding machine having a longitudinally horizontally reciprocable cut-off head for cutting off individual grids from a string of grids, a chute movable with the head in its longitudinal movement and close to the head to receive grids cut off from the string, a stretcher mechanism having horizontal blades movable laterally with respect to one another adapted to receive a grid thereabout, means for effecting separation of the blades to stretch a grid, said stretcher mechanism being mounted on a fixed support, means for operating the blades, means for propelling a cut-off grid within the chute, through the chute and onto the blades when the chute is close to the blades, a stripper on a fixed support associated with the blades for stripping stretched grids from off the blades, and means for operating the stripper to effect removal of a stretched grid when the chute is removed from the stripper mechanism.

4. The combination with a grid forming machine, a grid stretcher, means for transporting individual grids from the grid forming machine to the grid stretcher, means for operating the stretcher to stretch a grid thereon, a stripper cooperating with the stretcher to strip a stretched grid from off the stretcher, a tilting chute beneath the stretcher, means operative upon stripping the grid from the stretcher to tilt the chute to substantially horizontal position beneath the descending stripped grid, said last means being operative to enable the chute to reach an inclined grid discharging position on movement of the stripper to a non-operative position.

5. The combination with a grid forming machine, an elongated grid stretcher, means for transporting individual grids from the grid forming machine axially onto the grid stretcher, means for operating the stretcher laterally of its length to stretch a grid thereon, a stripper movable longitudinally of the stretcher to strip a stretched grid from off the stretcher, a tilting chute beneath the stretcher and having an upstanding arm, means movable with the stripper in stripping the grid from the stretcher to engage the arm to tilt the chute to substantially horizontal position beneath the descending stripped grid, said last means being operative to enable the chute to reach an inclined grid discharging position on movement of the stripper to a non-operative position.

6. The combination with a grid forming machine having a reciprocatable element, a grid stretcher mounted on a fixed support, and a chute mounted on the reciprocatable element for transporting individual grids from said grid forming machine to said stretcher, said chute comprising a casing including a cover, the chute having open opposite article receiving and discharge ends and a chute air inlet port intermediate the ends of the chute and inclined toward the discharge end of the chute so as to create a vacuum at the receiving end of the chute and a pressure at the discharge end thereof.

7. The combination with a grid forming machine having means to wind a string of grids about grid side rods and a cut off head to cut the side rods to form individual grids out of said string, a covered chute mounted on the head to receive said cut off grids, the entrance to the chute having a long vertical mouth to allow for tilt of the grid as it is being cut off from the string, and means operative in conjunction with the covered chute to transport cut off grids therethrough.

8. The combination with a grid forming machine having means to wind a string of grids about grid side rods and a cut off head to cut the side rods to form individual grids out of said string, a covered chute mounted on the head to receive said cut off grids, the entrance to the chute having a long vertical mouth to allow for tilt of the grid as it is being cut off from the string, and means operative in conjunction with the covered chute to transport cut off grids therethrough and means to receive the grids when discharged from the chute.

9. The combination with a grid forming mechanism having means including a reciprocating element to form individual grids, a chute mounted on said reciprocating element to receive the grids from the grid forming mechanism, a grid stretcher on a fixed support to receive grids discharged from said chute and air means to transport a grid through said chute, said chute comprising a casing including a base part with a long vertical mouth at the receiving end of the chute, a displaceable cover rearwardly of the mouth, and an air inlet into the chute inclined in the direction of the discharge end of the chute.

10. In a grid stretcher, a housing having a horizontal arm, a pair of slideways in the horizontal arm, one of said slideways being in the undersurface of the arm and the other in the upper surface of the arm, a pair of stretcher blades mounted on said housing and spring urged toward each other, a spreader tongue movable between the blades to spread the same against the action of the spring, a slide in the undersurface slideway mounting the tongue and means for operating the slide, and a second slide in the upper surface slideway mounting a stripper mechanism and means for moving the second slide, said stripper mechanism lying close to and movable along the length of the stretcher blades.

11. In a grid stretcher, a housing, a pair of parallel slideways in the housing and slides in said slideways, means to reciprocate the same, a pair of stretcher blades mounted on said housing and spring urged toward each other, a tongue movable in between the blades to separate them, said tongue being connected with a first one of the slides, a pair of combined stop and stripper devices cooperating with the blades with the devices close to the blades and movable therealong, the faces of the devices facing the direction of movement of the strippers being in parallel alignment to properly arrest an article thrust against the faces, said devices being mounted on the second of said slides.

12. In a grid stretcher, a housing, a pair of parallel slideways in the housing and slides in said slideways, means to operate said slides, a stretcher blade mounted in an adjusted position on said housing, a companion stretcher blade slidably mounted in said housing and spring urged toward said first stretcher blade, a tongue movable between the blades to effect spreading apart of the blades, means mounting said tongue on one of the slides, a pair of strippers cooperative with, close to and movable along the length of the blades, said strippers being supported by the second of said slides, the stripper close to the first of said blades being adjustably mounted in a fixed position relative to its supports, the stripper close to the slidable blade being pivotally mounted relative to its support, and means urging the pivoted stripper toward the companion stretcher blade.

13. In a grid stretcher a housing, a pair of stretcher blades mounted on said housing, one of the blades being movable relative to the other, means urging the blades together, a tongue movable in between the blades and operative to separate them, a slide mounting the tongue, adjustable means engageable with the slide to limit the motion of the slide and thereby limit the spreading action of the tongue, a motor support bar adjustable in the direction of movement of the tongue, an air motor mounted on said support and connecting means between the air motor and the tongue, whereby independent adjustments of the extent of movement of the tongue and of the initial position of the tongue may be obtained, to thereby determine the spreading action of the blades.

14. In a grid stretcher a housing, a pair of stretcher blades mounted on said housing, one of the blades being movable relative to the other, means urging the blades together, a tongue movable in between the blades and operative to separate them, a slide mounting the tongue, adjustable means engageable with the slide to limit the motion of the slide and thereby limit the spreading action of the tongue, a motor support bar adjustable in the direction of movement of the tongue, an air motor mounted on said support and connecting means between the air motor and the tongue, whereby independent adjustments of the extent of movement of the tongue and of the initial position of the tongue may be obtained, to thereby determine the spreading action of the blades, said adjustable means which is engageable with the slide being a screw mounted in a plate, the plate being permanently secured to the motor support bar whereby the initial position of the tongue may be adjusted without disturbing the throw of the tongue.

References Cited in the file of this patent

UNITED STATES PATENTS

| | | |
|---|---|---|
| 1,580,054 | Laencher | Apr. 6, 1926 |
| 1,825,250 | Rehak | Sept. 29, 1931 |
| 1,830,222 | Brindle | Nov. 3, 1931 |
| 2,034,653 | Flaws | Mar. 17, 1936 |
| 2,064,169 | Kershaw | Dec. 15, 1936 |
| 2,183,635 | Barker | Dec. 19, 1939 |
| 2,380,320 | La France | July 10, 1945 |
| 2,420,299 | Campbell | May 13, 1947 |
| 2,583,700 | Lyon | Jan. 29, 1952 |
| 2,586,629 | Englert | Feb. 19, 1952 |
| 2,764,800 | Harwood | Oct. 2, 1956 |
| 2,778,386 | Lindsay | Jan. 22, 1957 |